(12) United States Patent
Dharmadhikari et al.

(10) Patent No.: US 12,710,331 B2
(45) Date of Patent: Aug. 18, 2026

(54) METHOD AND SYSTEM OF LEAK DETECTION

(71) Applicant: South East Water Corporation, Frankston (AU)

(72) Inventors: Ninad Dharmadhikari, Frankston (AU); Jonathan Crook, Frankston (AU); Eddy Mofardin, Frankston (AU); Vinay Kumar, Frankston (AU); Juan Camilo Londono Rios, Frankston (AU); Andrew Forster-Knight, Frankston (AU)

(73) Assignee: South East Water Corporation, Frankston (AU)

( * ) Notice: Subject to any disclaimer, the term of this patent is extended or adjusted under 35 U.S.C. 154(b) by 326 days.

(21) Appl. No.: 18/264,172

(22) PCT Filed: Dec. 1, 2021

(86) PCT No.: PCT/AU2021/051434
§ 371 (c)(1),
(2) Date: Aug. 3, 2023

(87) PCT Pub. No.: WO2022/198260
PCT Pub. Date: Sep. 29, 2022

(65) Prior Publication Data

US 2024/0035630 A1 Feb. 1, 2024

(30) Foreign Application Priority Data

Mar. 22, 2021 (AU) ................................ 2021900836

(51) Int. Cl.

*G01M 3/24* (2006.01)
*E03B 7/00* (2006.01)
*F17D 5/06* (2006.01)

(52) U.S. Cl.
CPC ............. *G01M 3/243* (2013.01); *E03B 7/003* (2013.01); *F17D 5/06* (2013.01)

(58) Field of Classification Search
CPC ........... F17D 5/06; G01M 3/243; E03B 7/003
See application file for complete search history.

(56) References Cited

U.S. PATENT DOCUMENTS

2012/0007743 A1 1/2012 Solomon
2014/0121999 A1 5/2014 Bracken et al.
(Continued)

FOREIGN PATENT DOCUMENTS

EP 3112820 A1 1/2017
WO 2008081148 A2 7/2008
(Continued)

OTHER PUBLICATIONS

English language abstract and machine-assisted English translation for WO 2008/081148 A2 extracted from espacenet.com database on Jan. 9, 2025, 12 pages.
(Continued)

*Primary Examiner* — Nathaniel J Kolb
(74) *Attorney, Agent, or Firm* — Howard & Howard Attorneys PLLC

(57) ABSTRACT

A method of detecting and locating a fluid leakage in a fluid pipeline network includes providing a plurality of sensors in an area of the pipeline network. Each sensor is configured to output data relating to an acoustic or vibration measurement associated with a part of the pipeline network proximate said sensor. The method further including recording the acoustic or vibration measurement output data, transforming the output data from a time domain to a frequency domain, determining a leakage condition, computing a sum value of the measured frequency values and associating said sum value with a corresponding sensor of the plurality of sensors,
(Continued)

and locating a source of the fluid leakage by identifying one or more sensor(s) of the plurality of sensors in the area of the pipeline network that is closest to the source of the fluid leakage.

16 Claims, 9 Drawing Sheets

(56) References Cited

U.S. PATENT DOCUMENTS

| | | | | |
|---|---|---|---|---|
| 2014/0174186 | A1* | 6/2014 | Salomon | G01M 3/24<br>73/587 |
| 2015/0002300 | A1 | 1/2015 | Cho et al. | |
| 2015/0241297 | A1* | 8/2015 | Hoshuyama | E03B 7/003<br>702/51 |
| 2015/0253216 | A1 | 9/2015 | Shinoda et al. | |
| 2017/0102286 | A1* | 4/2017 | Inoue | G01N 29/14 |
| 2020/0072661 | A1* | 3/2020 | Forster-Knight | G01H 11/08 |
| 2021/0055153 | A1* | 2/2021 | Forster-Knight | G01H 11/08 |

FOREIGN PATENT DOCUMENTS

| | | | |
|---|---|---|---|
| WO | 2018068098 | A1 | 4/2018 |
| WO | 2020215116 | A1 | 10/2020 |

OTHER PUBLICATIONS

De Silva, D. et al., “Computer Aided Leak Location and Sizing in Pipe Networks”, Urban Water Security Research Alliance Technical Publication No. 17 (2nd Edition), Apr. 2011, pp. 1-37.

Han, Q. et al., “Toward an Integrated Approach to Localizing Failures in Community Water Networks”, IEEE 37th International Conference on Distributed Computing Systems (ICDCS), 2017, pp. 1250-1260.

International Search Report for Application No. PCT/AU2021/051434 dated Feb. 14, 2022, 6 pages.

Mofardin, E. et al., “Vibration Sensors: Listening to Network Leaks”, Water New Zealand Conference & Expo, https://www.waternz.org.nz/Article?Action=View&Article_id=1883, Nov. 17-19, 2020, 18 pages.

Ratnayaka, D. et al., “Chapter 14—Distribution Practice”, Water Supply, Sixth Edition, ISBN 9780750668439, 2009, pp. 531-560.

Stajanca, P. et al., “Detection of Leak-Induced Pipeline Vibrations Using Fiber-Optic Distributed Acoustic Sensing”, Sensors, 2018 vol. 18, Issue No. 9, 2841, pp. 1-18.

Youtube, “Vibration Sensors: Listening to Network Leaks”, Sotto Leak Detection Iota Services, www.youtube.com/watch?v=yUdGRMrJUoc, Dec. 17, 2020, 2 pages.

* cited by examiner

500

504

502

| | A | B | C | D | E | F |
|---|---|---|---|---|---|---|
| Date 1 | 3973 | 62870 | 200096 | 30246 | 361 | 294 |
| Date 2 | 3840 | 60925 | 188037 | 36194 | 363 | 332 |
| Date 3 | 4298 | 55352 | 176352 | 34832 | 379 | 203 |
| Date 4 | 3660 | 55558 | 166735 | 30743 | 342 | 0 |
| Date 5 | 330 | 353 | 0 | 213 | 309 | 271 |
| Date 6 | 283 | 352 | 271 | 192 | 384 | 249 |

| | A | B | C | D | E | F |
|---|---|---|---|---|---|---|
| Average | 3943 | 58676 | 182805 | 33004 | 361 | 276 |

506

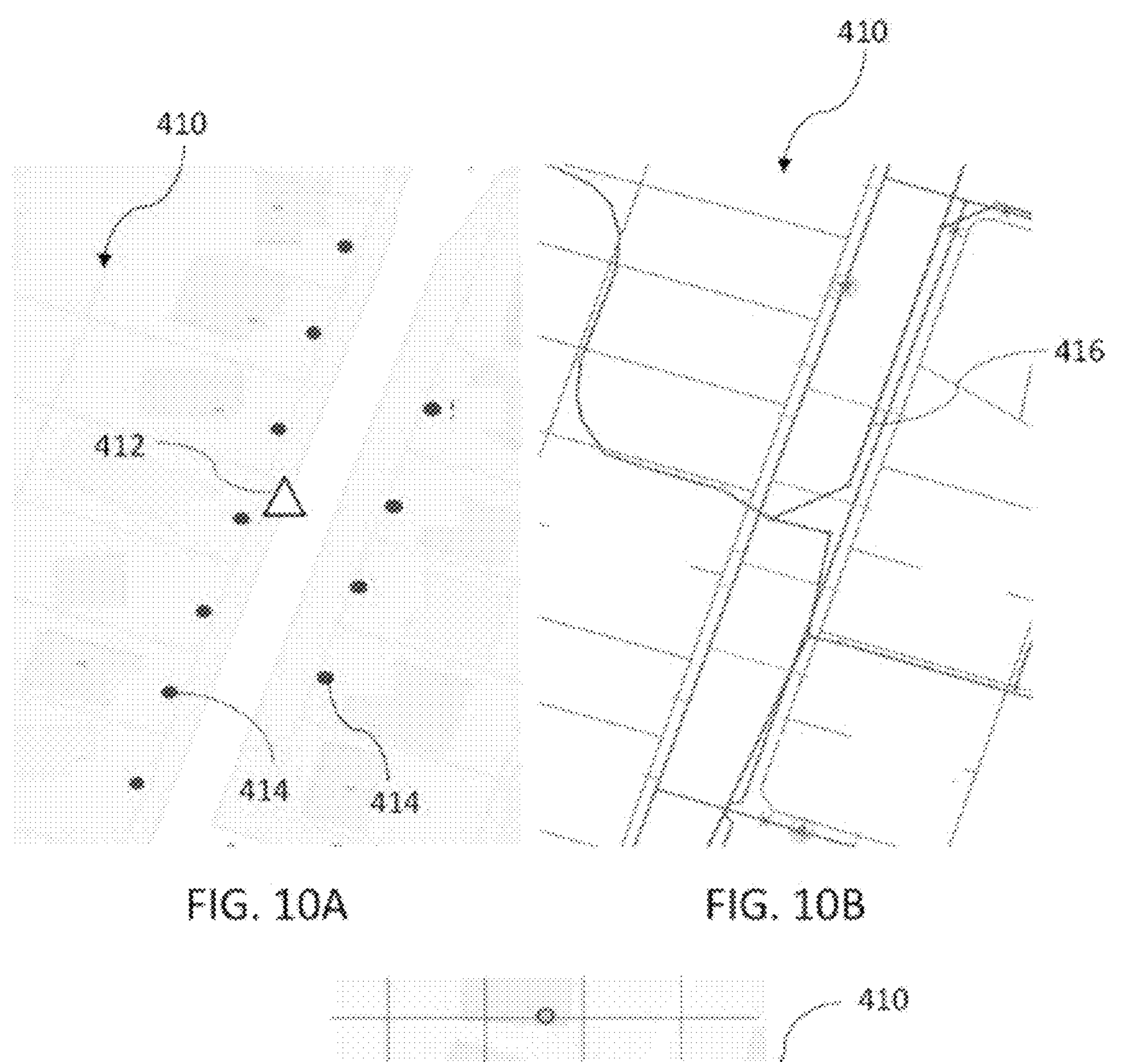
FIG. 10A
FIG. 10B
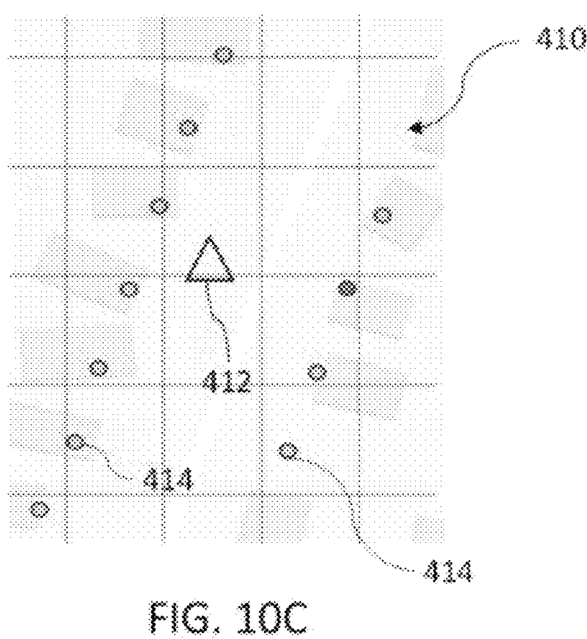
FIG. 10C

METHOD AND SYSTEM OF LEAK DETECTION

CROSS-REFERENCE TO RELATED APPLICATIONS

The present application is the National Stage of International Patent Application No. PCT/AU2021/051434 filed on Dec. 1, 2021, which claims priority to and all the benefits of Application No. AU 2021900836 filed on Mar. 22, 2021, both of which are hereby expressly incorporated herein by reference in their entirety.

FIELD OF THE INVENTION

The invention relates to a method and a system for detecting and locating fluid leakage in a pipeline network, and more specifically for detecting water leakage in a water supply pipe network.

BACKGROUND TO THE INVENTION

Fluids, such as water, may be supplied from a source such as a reservoir to distributed geolocations by means of a network of pipelines. Leakage may occur in the pipeline network due to damages or faults developed over time with respect to, for example, pipes, valves and flow controllers. While some leakage can be minor and have minimal consequences, some leakage can be significant and/or have significant consequences if they are not identified early and repaired.

The problem is that since large sections of the pipe network are typically buried underground and not easily accessible for inspection or maintenance, as is common in urban water supply networks, any presence of water leakage, its magnitude or root source location are, in practice, technically difficult to determine with a high degree of reliability.

Conventional leak detection techniques may involve periodic site attendance by maintenance crew at pipeline network locations suspected of water leakage, and the maintenance crew may be required to be present onsite for prolonged periods of time to conduct tests by digging up the ground to expose pipelines all the while using cumbersome acoustic-listening devices. This process of leakage detection is costly, time consuming and ineffective at locating the actual source of a leakage. Often leakages would have grown to become a significant problem by the time site attendance by maintenance staff is required.

Some fluid leak detection techniques involve the installation of select acoustic or vibration sensors at suspected leakage locations to detect abnormal sound or vibration signatures, which may infer the presence of a leak when compared with standard data readings. However, this approach may still require the costly process of digging up the ground to expose pipelines to install these select sensors, and while the sensors may be able to confirm the presence of a fluid leak in a given general area, they are not themselves capable of locating the source of the leak. This inevitably leads to further digging of the ground to follow an expensive and labour intensive trial-and-error approach.

Furthermore, none of the leak detection approaches discussed above are designed to monitor pipelines continuously overtime and to detect fluid leakage before they become a significant problem that warrants site attendance.

The applicant has determined that it would be advantageous to provide an improved method and system for detecting and locating fluid leakage in a pipeline network.

The present invention, in its preferred embodiments, seeks to at least in part alleviate the above-identified problems.

SUMMARY OF THE INVENTION

According to an aspect of the present invention, there is provided a method of detecting and locating a fluid leakage in a fluid pipeline network, the method comprising: providing a plurality of sensors in an area of the pipeline network, each of said sensor being configured to output data relating to an acoustic or vibration measurement associated with a part of the pipeline network proximate said sensor, recording the acoustic or vibration measurement output data from said plurality of sensors, transforming the output data from a time domain to a frequency domain, determining a leakage condition by comparing, within a predetermined frequency range, measured frequency values of the transformed output data in the frequency domain with a predetermined threshold value for a corresponding frequency, computing a sum value of the measured frequency values within a predetermined frequency range of the transformed output data in the frequency domain and associating said sum value with a corresponding sensor of said plurality of sensors, and locating a source of the fluid leakage by identifying one or more sensor(s) of the plurality of sensors in the area of the pipeline network that is closest to the source of the fluid leakage based on comparing said sum values associated with said plurality of sensors in the area of the pipeline network over a period of time.

According to another aspect of the present invention, there is provided a system for detecting and locating a fluid leakage in a fluid pipeline network, the system comprising: a plurality of water meters installed in an area of the pipeline network, a sensor connected to each of the plurality of water meters, each sensor being configured to output data relating to an acoustic or vibration measurement associated with a part of the pipeline network proximate said sensor, wherein the water meter and/or the sensor is configured to record the acoustic or vibration measurement output data, transform the output data from a time domain to a frequency domain, and send the output data to a remote server, and wherein the remote server comprises a processor configured to: determine a leakage condition by comparing, within a predetermined frequency range, measured frequency values of the transformed output data in the frequency domain with a predetermined threshold value for a corresponding frequency, compute a sum value of the measured frequency values within a predetermined frequency range of the transformed output data in the frequency domain and associating said sum value with a corresponding sensor of said plurality of sensors, and locate a source of the fluid leakage by identifying one or more sensor(s) of the plurality of sensors in the area of the pipeline network that is closest to the source of the fluid leakage based on comparing said sum values associated with said plurality of sensors in the area of the pipeline network over a period of time.

According to yet a further aspect of the present invention, there is provided a remote server when used for detecting and locating a fluid leakage in a fluid pipeline network, the server comprising a processor configured to: receive output data, from a plurality of water meters and/or sensors in an area of the pipeline network, relating to acoustic or vibration measurements as measured by sensors associated with a part of the pipeline network proximate said sensors, transform any time domain output data to data in a frequency domain, determine a leakage condition by comparing, within a predetermined frequency range, measured frequency values of the transformed output data in the frequency domain with a predetermined threshold value for a corresponding frequency, compute a sum value of the measured frequency values within a predetermined frequency range of the transformed output data in the frequency domain and associating said sum value with a corresponding sensor, and locate a source of the fluid leakage by identifying one or more sensor(s) in the area of the pipeline network that is closest to the source of the fluid leakage based on comparing said sum values associated with said plurality of sensors in the area of the pipeline network over a period of time.

Preferably, locating a source of the fluid leakage further comprises identifying at least two sensors of the plurality of sensors in the area of the pipeline network that is closest to the source of the fluid leakage based on comparing said sum values associated with said plurality of sensors in the area of the pipeline network over a period of time, and estimating a location of the source of the fluid leakage based on (1) a relative geographical pipeline distance between the identified sensors, (2) configuration of pipelines between the identified sensors, and (3) the identified sensors' respective sum values.

Preferably, locating a source of the fluid leakage comprises comparing each of said sum values of said plurality of sensors against a predetermined sum threshold value of about 250 to about 300.

Alternatively, in the step to locate a source of the fluid leakage, the processor compares said sum values of said plurality of sensors against a predetermined sum threshold value of about 250 to about 300.

Preferably, each of said sum values of said plurality of sensors is adjusted by a predetermined material sensitivity multiplier calibrated to the material of the corresponding pipeline in the network.

Preferably, each of said sum values of said plurality of sensors is adjusted by a predetermined pressure sensitivity multiplier calibrated to accord with a fluid pressure of the corresponding pipeline in the network.

Preferably, each of said sum values of said plurality of sensors is adjusted by a predetermined flow sensitivity multiplier calibrated to accord with a fluid flow type of the corresponding pipeline in the network.

Preferably, each of said sum values of said plurality of sensors is adjusted by a predetermined soil condition sensitivity multiplier calibrated to accord to a soil condition of the area of the pipeline network.

Preferably, locating a source of the fluid leakage further comprises the steps of determining whether said acoustic or vibration measurement output data was collected during a period of rainfall in the area of the pipeline network and, if so, adjusting a predetermined threshold value when comparing measured frequency values and/or sum values of any output data collected during the period of rainfall.

Alternatively, in the step to locate a source of the fluid leakage, the processor is further configured to determine whether said acoustic or vibration measurement output data was collected during a period of rainfall in the area of the pipeline network and, if so, adjusting a predetermined threshold value when comparing measured frequency values and/or sum values of any output data collected during the period of rainfall.

Preferably, determination of the period of rainfall is based on (1) comparing the measured 2 frequency values and/or the sum values of said plurality of sensors across a plurality of sensors in the area of the pipeline network against a baseline threshold value and outputting a difference value for each sensor, (2) comparing said difference value for each sensor over consecutive days, and (3) weather forecast data of the area at the time the output data was measured.

Preferably, the method further comprises the step of determining the magnitude of fluid leakage based on said sum values of said plurality of sensors in the area.

Preferably, the step of determining the magnitude of fluid leakage further comprises adjusting said sum values of said plurality of sensors in the area with any one or more of the sensitivity multipliers.

Preferably, a Fast Fourier Transform (FFT) process is used to convert the output data from a time domain to a frequency domain.

Preferably, the frequency values of the transformed output data is separated into 256 discrete containers.

Preferably, the predetermined frequency range is between zero and 1,200 Hz.

Alternatively, the predetermined frequency range is between 350 Hz and 1,000 Hz.

Preferably, the predetermined threshold value for determining the leakage condition is about 60.

Preferably, the predetermined threshold value and/or the predetermined sum threshold value is calibrated for each of the plurality of sensors based on baseline non-leakage measurements of each sensor at predetermined measurement times to account for traffic and ambient noise of a pipeline network in the area proximal to the respective sensor.

Preferably, each of said sensors is configured to take acoustic or vibration measurements associated with a part of the pipeline network proximate said sensor at spaced intervals during a predetermined time period.

Preferably, each of said sensors is configured to take acoustic or vibration measurements at 15 minute intervals from midnight to 2 AM.

Preferably, each of said sensors is connected to an associated water meter, which records the acoustic or vibration measurement output data from the connected sensor, transforms the output data from a time domain to a frequency domain, and sends the data to a remote server.

Preferably, locating a source of the fluid leakage further comprises the steps of (1) obtaining water usage readings from the associate water meter during the step of recording the acoustic or vibration measurement output data from said sensors to determine water usage, and (2) discarding any acoustic or vibration measurement output data collected from said sensor during a period of water usage.

Alternatively, in the step to locate a source of the fluid leakage, the processor is further configured to (1) obtain water usage readings from the water meter during the step of recording the acoustic or vibration measurement output data from said sensors to determine water usage, and (2) discarding any acoustic or vibration measurement output data collected from said sensor during a period of water usage.

Aspects of the present invention and embodiments of the aspects described in the preceding paragraphs will become apparent from the following description.

In the description and drawings of this embodiment, same reference numerals are used as have been used in respect of the first embodiment, to denote and refer to corresponding features.

While steps/components of the method/system will be described below for use in combination with each other in the preferred embodiments of the present invention, it is to be understood by a skilled person that some aspects of the present invention are equally suitable to be used interchangeably between one or more embodiments of the present invention and/or suitable for use as standalone inventions that can be individually incorporated into other methods and systems not described herein.

The word "about" or "approximately" when used in relation to a stated reference point for a quality, level, value, number, frequency, percentage, dimension, location, size, amount, weight or length may be understood to indicate that the reference point is capable of variation, and that the term may encompass proximal qualities on either side of the reference point.

As used herein, the word "substantially" may be used merely to indicate an intention that the term it qualifies should not be read too literally and that the word could mean "sufficiently", "mostly" or "near enough" for the patentee's purposes.

BRIEF DESCRIPTION OF THE FIGURES

Embodiments of the present invention will now be described, by way of non-limiting example only, with reference to the accompanying Figures, in which:

FIG. 10A is a schematic map of another area of the pipeline network with each node corresponding to a water meter/sensor, and the location of the source of leakage;

FIG. 10B is a schematic map of the area of FIG. 10A showing the underlying pipeline network connecting the nodes of FIG. 10A;

FIG. 10C is schematic map of the area of FIG. 10A with nodes coloured with their corresponding measured frequency sum values.

DETAILED DESCRIPTION

The Applicant discloses, in an earlier PCT publication (WO 2018/068098), a new type of vibration sensor suitable for detecting vibration signatures and optionally combinable with a water meter to detect the presence of fluid leakage in a pipeline. The content of PCT publication no. WO 2018/068098 is hereby incorporated by reference in its entirety, and the present invention relates to an improved method and system for using the previously disclosed vibration sensor and/or water meter system for, in addition to detecting the presence of fluid leakage, further identifying the proximate locations of the source of the fluid leakage.

It is to be understood by a skilled person that while preferred embodiments of the invention are described with references to the vibration sensor and/or water meter system disclosed in PCT publication no. WO 2018/068098, some aspects of the invention, such as the method and system for identifying the proximate location of a fluid leakage, would be equally suitable for use with acoustic/vibration sensors and/or water meter systems not expressly described herein. As used herein, the terms acoustic measurement and vibration measurement may be used non-exclusively and/or interchangeably.

Preferred embodiments of the invention relates to a method of detecting and locating a fluid leakage in a fluid pipeline network. The method involves the use of acoustic and/or vibration data as measured and recorded by sensors installed throughout the pipeline network and one or more computing device(s) for processing the measured data to detect and locate a fluid leak. Also described herein is a system and a remote server configured for performing the steps of obtaining and processing relevant measurement data, determining a leakage condition and locating a source of the leakage. An aspect of the invention involves collecting data from a vast array of connected sensors and/or water meters in an area of a pipeline network, and processing collected data in a structured manner to estimate a location of fluid leakage in said area of the pipeline network. In some embodiments, external information such as weather-related data may be used to augment the processing step.

Figure 1:
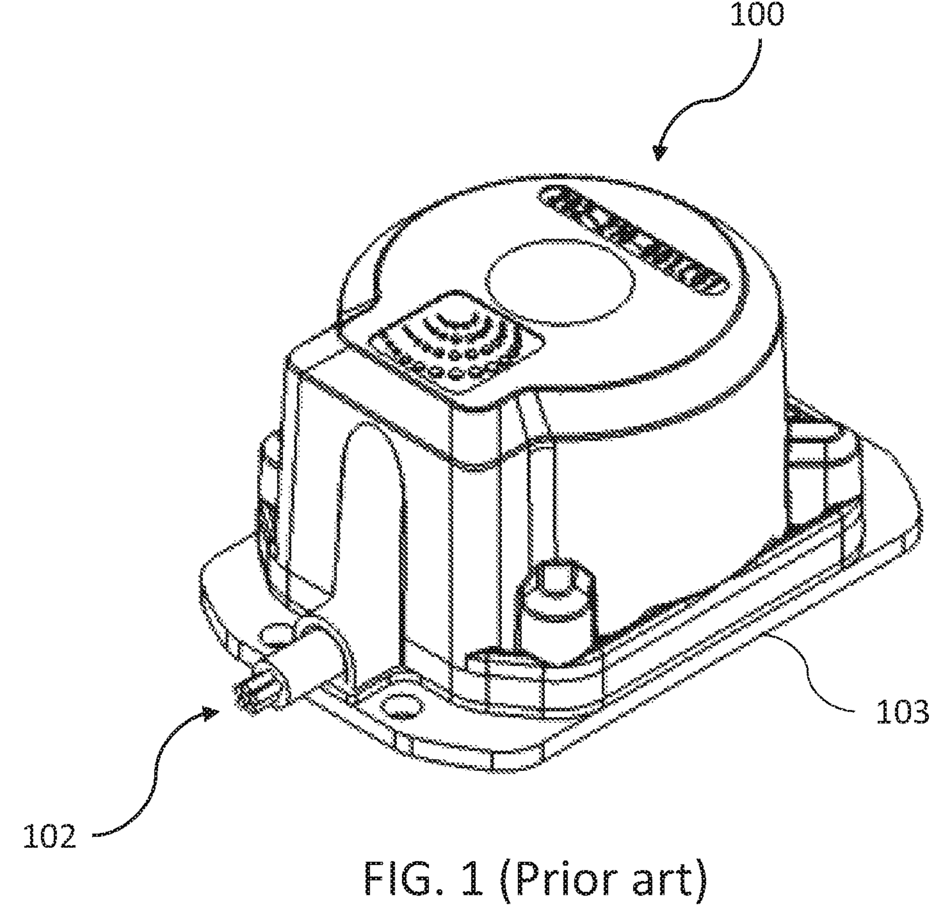
FIG. 1 is a perspective view of a prior art vibration sensor suitable for use with the present invention.

A sensor 100 as shown in FIG. 1 (and described in detail in WO 2018/068098) can be used to measure vibration characteristics of a part of a pipeline network when connected to the pipeline network. A suitable sensor for use with the present invention is not limited to vibration sensors but could also include sensors that measure acoustic characteristics in a pipe network. The typical sensor 100 includes wiring 102 for connecting to a water meter or a wireless transmission device for sending data to a remote server 211 and a base 103 for mounting against a fluid conduit 130, which is connectable to a pipeline network.

Figure 2A:
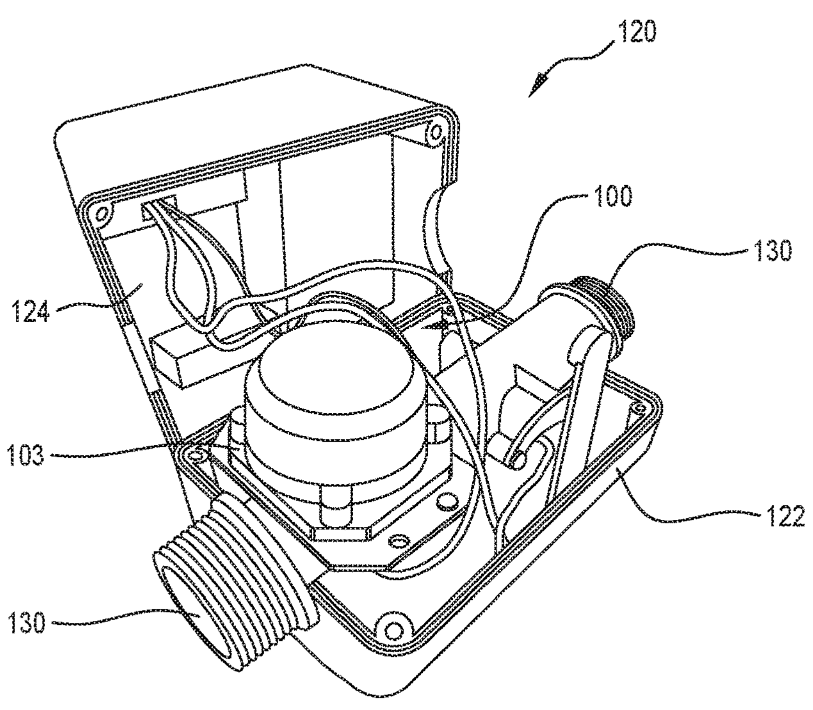
FIG. 2A is a photograph showing an opened water meter comprising a vibration sensor suitable for use with the present invention.
Figure 2B:
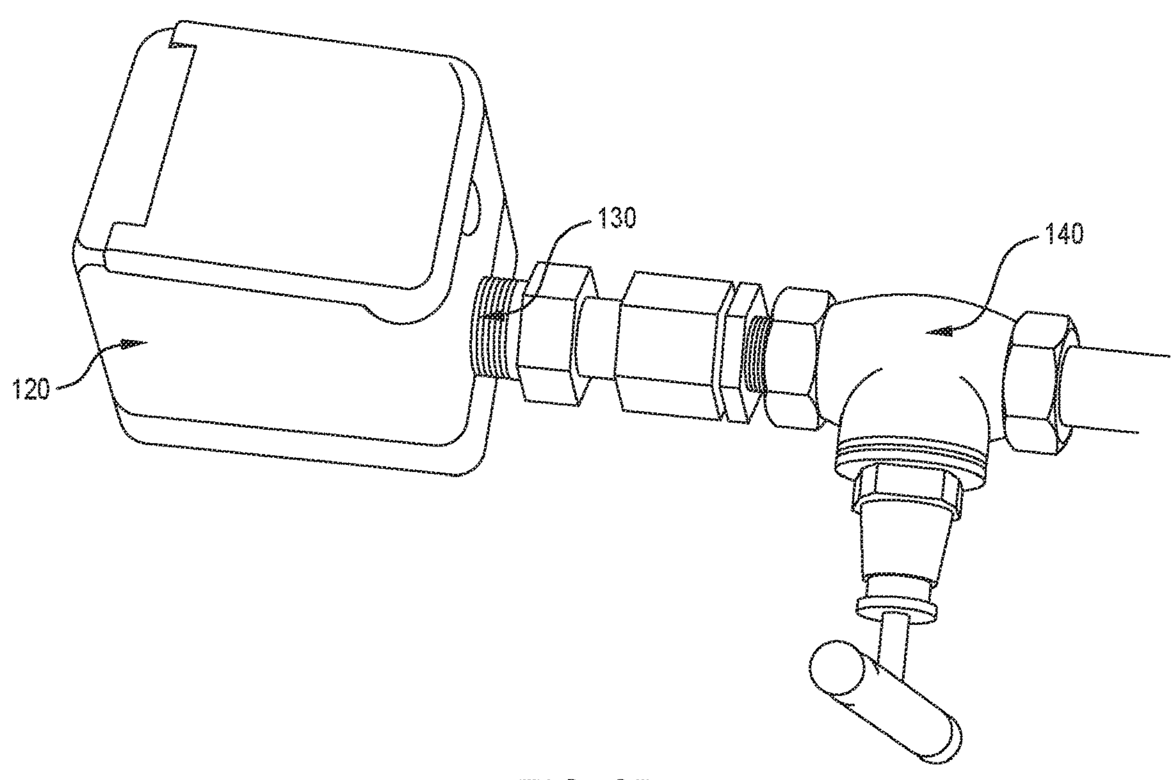
FIG. 2B is a photograph showing a water meter and vibration sensor assembly installed to a pipeline network in the field.

In the preferred embodiment, the sensor 100 is hosted inside a water meter assembly 120, as shown in FIGS. 2A and 2B. The water meter assembly 120 comprises the conduit 130 for passage of fluid therethrough, the sensor 100 which is mounted on top of the conduit 130 for measuring acoustic or vibration characteristics associated with fluid flows through the conduit 130 and/or nearby pipelines, and an onboard processor 124 which comprises a computing device, memory, a wireless transmitter and optionally internal power supply. The processor 124 is capable of communication and data transmission with the remote server 211. The water meter assembly 120 is further provided with a weather resistant housing 122. The term water meter 120 may be used hereinafter to refer to the water meter assembly unit, including any functions of the onboard processor 124.

As used herein, a computing device is any device capably of executing program code stored in memory. Memory may comprise a combination of volatile and non-volatile computer readable storage and has sufficient capacity to store program code executable by the computing device in order to perform appropriate processing function.

The remote server 211 is configured to receive data containing acoustic and/or vibration data from the water meter processor 124 and/or the sensor 100 and further process the data to identify sensors closest to the source of a fluid leak. As will be discussed in detail below, the remote server 211 is also configured to determine an approximate location of the source of the fluid leak based on the measured acoustic/vibration data and relative geographical pipeline distances between the closest sensors.

Referring to FIG. 2B, the conduit 130 of the water meter 120 is securely attached in line to a section of pipe. When installed, the conduit 130 is in fluid communication with the pipe network and the sensor 100 is configured to detect any vibrations propagated upstream or downstream in the pipe network, while fluid flows through the conduit 130 to/from the pipe network with no substantial impediment.

It has been observed that leakages in a water pipeline network exhibit different acoustic and/or vibration characteristics when compared with normal fluid flow, and these characteristics can be measured by examining the passive acoustic or vibration measurements of pipelines in the network. In one embodiment, the sensor 100, when installed to a pipeline network as described above, would detect different vibration measurement readings when a water leak is present in nearby pipelines. The acoustic and/or vibration characteristics have been observed to also differ, such as in amplitude and frequency response, depending on the scale and type of leakage. In order to determine whether a fluid leakage condition is present in the pipeline network, the acoustic and/or vibration measurement readings of the sensor 100 would need to be processed as described below.

Figure 3:
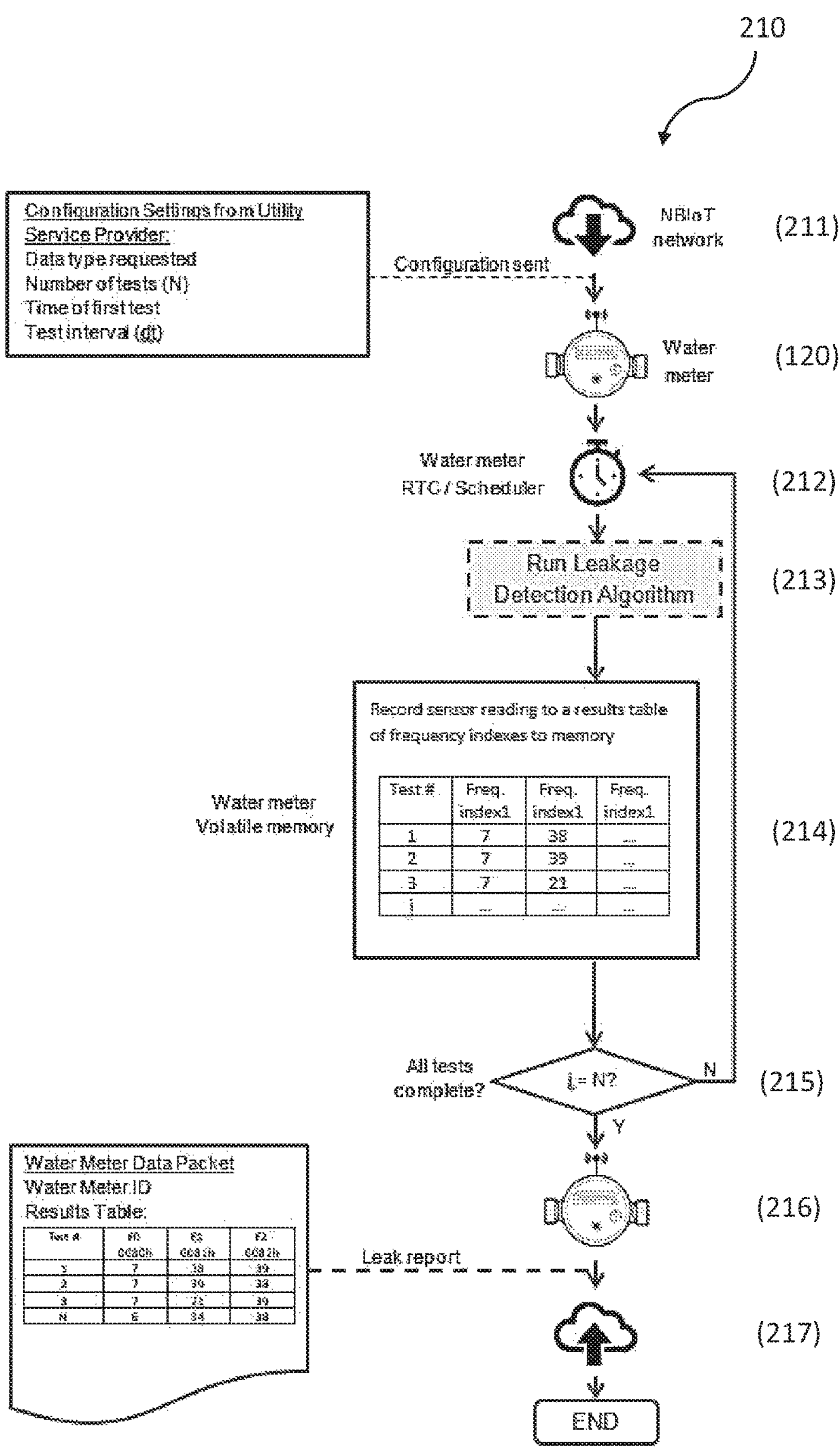
FIG. 3 is a flow diagram showing the process by which the water meter and vibration sensor obtains and records output data.

FIG. 3 is a flow diagram of the process by which the water meter 120 and/or vibration sensor 100 perform the steps 210 of obtaining and recording vibration measurement data 217 according to a preferred embodiment of the invention. A remote server 211 may query the water meter 120 and/or vibration sensor 100 with an instruction set to execute a leakage detection routine 213. In some configurations, the water meter 120 is configured to run instances of the routine 213 or data recordings using the sensor 100 according to a timed schedule without any prompts from the remote server 211. The leakage detection routine 213 involves taking acoustic and/or vibration measurements by the associated sensor 100 at instructed times and time intervals, and recording the corresponding data output from the sensor 100. In one embodiment, the leakage detection routine 213 involves instructing the sensor 100 to take split second vibrations measurement readings, every 15 minutes from midnight to 2 AM—thus resulting in 9 readings per scheduled run. This is a non-limiting example of taking measurement readings during low-noise conditions. It is to be understood that suitable readings may be taken at other times and at frequencies not specified herein, without departing from the invention.

The water meter 120 and/or the sensor 100 then converts measured data from the time domain to the frequency domain using, for example, Fast Fourier Transformations (FFT). The converted data in the frequency domain is then recorded in a data array 214. Once all instances of data measuring and recordal have been completed in step 215, the recorded data array 214 is processed into data packets 216 by the water meter 120 along with an identification number of the water meter 120, and transmitted as measured data 217 to the remote server 211 for further processing. The data recordal steps 210 may be repeated periodically, including on the same day, on consecutive days, or on alternating days.

Transmission of data to the remote server 211 can be completed by wireless or wired data connection between the water meter 120 or sensor 100 and the remote server 211. In some configurations, the water meter 120 and/or sensor 100 transmits uploads raw measured data to the remote server 211 for conversion into the frequency domain and any subsequent numerical analysis. In some embodiments, measured and/or processed vibration data 217 is recorded and held in the memory of the water meter 120 and transmitted to the remote server 211 periodically, while in other embodiments, the measured data 217 may be recorded and transmitted to the remote server 211 in real-time. In further embodiments, recorded measurement data 214, 217 may be downloadable by a local computing device connected directly to the water meter 120 and/or sensor 100.

In some configurations, the water meter 120 and/or sensor 100 may include a signal amplifier to improve the sensitivity of the sensor 100 when taking vibration measurements. In other configurations, raw or processed measurement data 214, 217 may be further processed to remove any background noise and other spurious values in the data. Processing of the data may include signal filtering (high-pass or low-pass) and smoothing of data. Measured data is further processed by the remote server 211 to detect false-positive conditions, which will be described in detail below.

Figure 4:
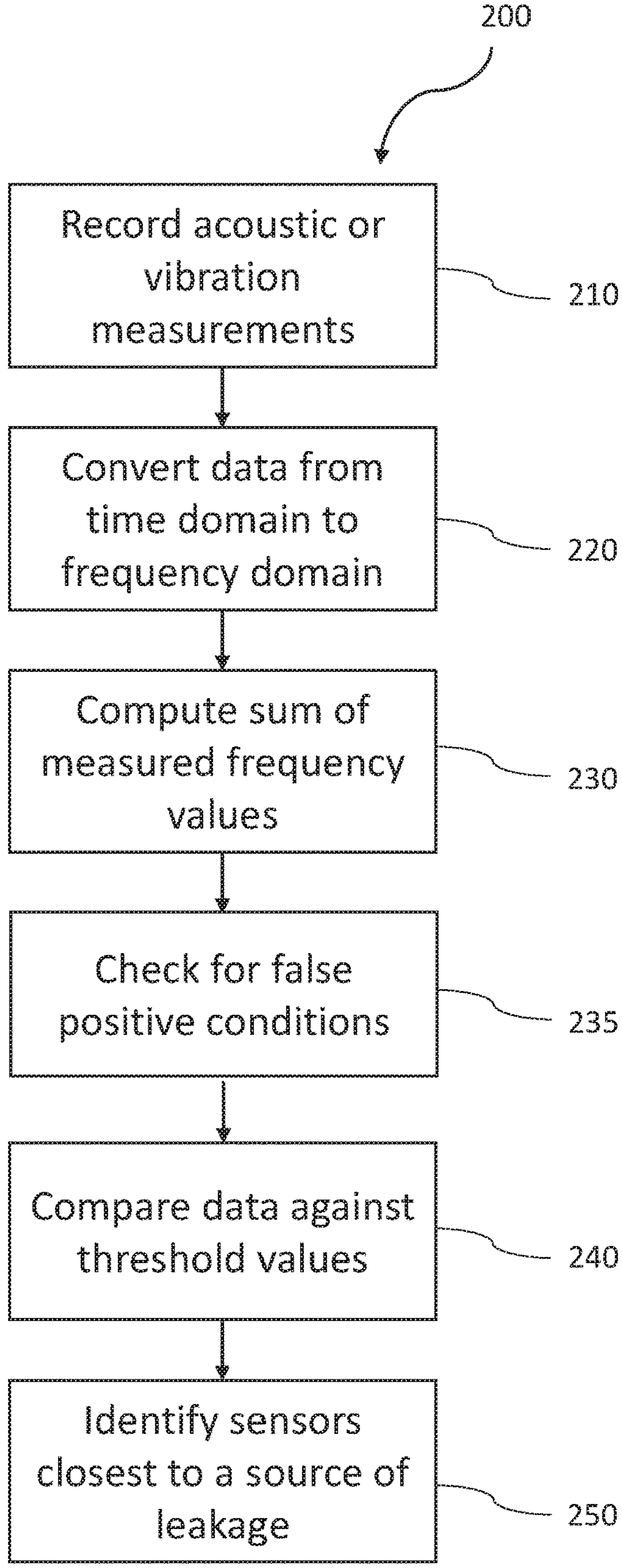
FIG. 4 is a flow diagram showing the general method steps of leak detection in accordance with a preferred embodiment of the present invention.

FIG. 4 is a flow diagram showing the general method steps 200 of leak detection in accordance with a preferred embodiment of the present invention. In general, the method steps 200 involve: the step 210 of recording acoustic or vibration measurements of a part of the pipeline network using the sensor 100 as discussed above, the step 220 of converting raw data measured from the time domain to processed vibration data 217 of the frequency domain, the step of 230 of computing a sum 502 of the measured frequency values of the vibration data 217 (in other words, calculating an area under the frequency response curve 352), the step 235 of checking the measured data for false-positive conditions, the step 240 of comparing processed vibration data 217 and sum of frequency values 502 against threshold values 312, and the step 250 of evaluating processed vibration data 217 and sum frequency values 502 to identify the sensors 100 closest to a source of leakage. It is to be understood that while the steps have been described in a certain order, the order of some of the steps, such as step 235, may be altered without departing from the invention. In some instances, the step 235 of checking the measured data for false-positive condition may occur immediately after recording of the raw measurement data 214. Details of the method steps will be discussed below with reference to two field trial examples.

Figures 5, 6:
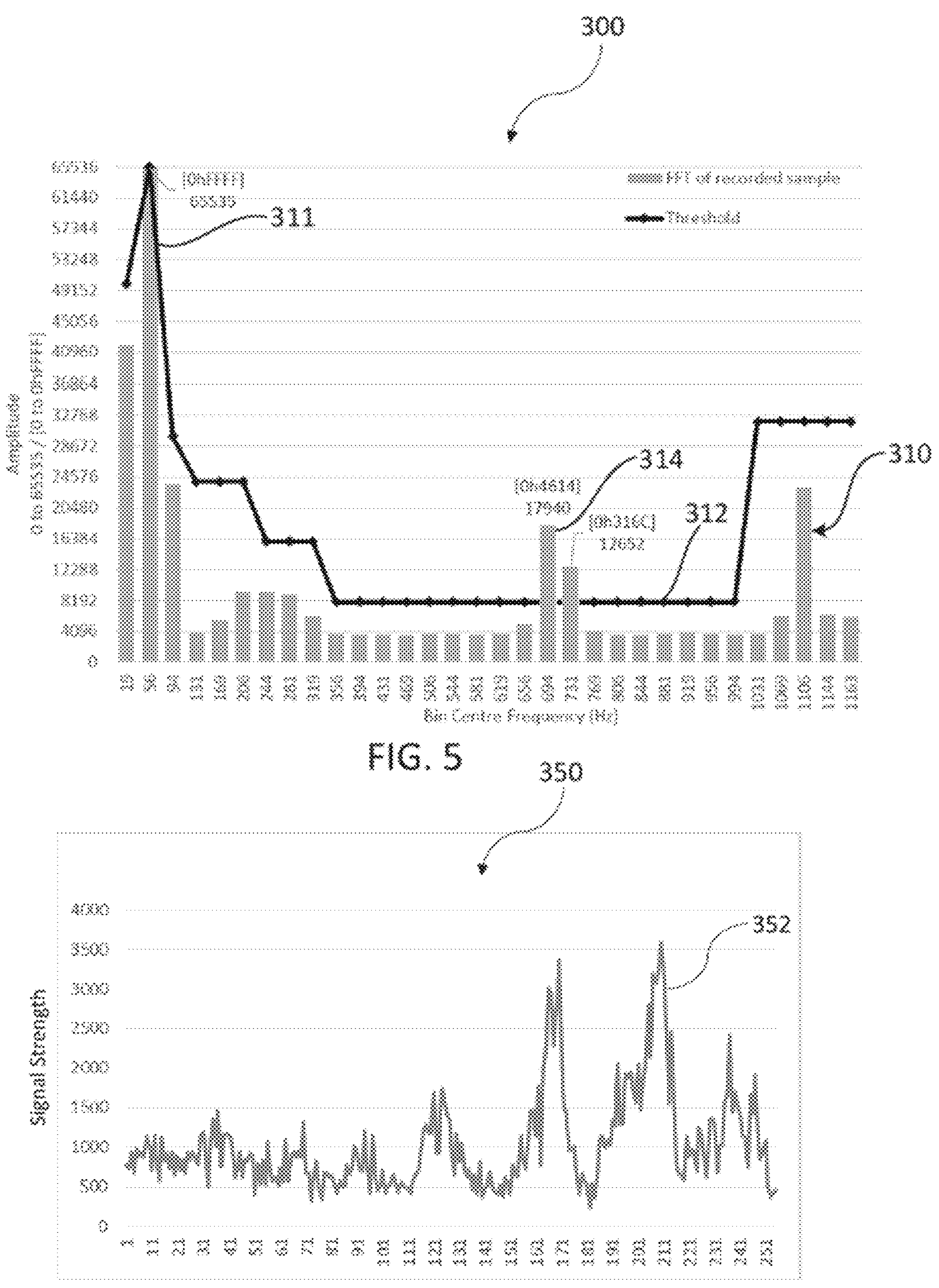
FIG. 5 is a graph of vibration measurement output in the frequency domain showing the threshold values.
FIG. 6 is a further graph of vibration measurement output in the frequency domain showing leakage characteristics for a predetermined frequency range.

In step 220, the raw measured vibration data 214 as recorded by the water meter 120 and/or the sensor 100 is numerically transformed from a time domain to a frequency domain, by using an FFT algorithm for example. In one embodiment, the on-board FFT algorithm of the water meter 120 and/or sensor 100 resolves 512 data samples into 256 frequency bins or containers, each representing approximately 4.7 Hz steps in the frequency range of between zero and 1,200 Hz. FIG. 5 shows a chart 300 of the data in the frequency domain, where frequency values 310 (as shown in bars) of the recorded vibration data 217 is plotted along with predetermined threshold values 312, which varies dynamically across the frequency range. A leakage condition is met if a frequency value 310 exceeds the predetermined threshold value 312 for a given frequency or frequency bin.

In one embodiment, an alarm is raised by the water meter 120 and/or the remote server 211 to note possible leakage detection in a pipeline network, if a given frequency value 310 exceeds its corresponding threshold value 312. In the example provided in FIG. 5, it may be seen that columns relating to frequencies 694 and 731 Hz would result in leak alarms being raised as the frequency values 314 exceeded the corresponding threshold value 312.

To reduce occurrences of false-positives, the predetermined threshold values 312 is set to accounts for naturally occurring noises in the system. Note that in the example of FIG. 5, the high peak frequency value 311 at 56 Hz does not trigger a leak detected status, as a higher predetermined threshold value 312 has been set to ignore this frequency. This method is used to help prevent false triggering due to mains frequency interference or local vehicular traffic noise. In other embodiments, a given frequency spectrum may be compared with frequency spectrum of non-leaking pipe network of similar characteristics when setting threshold values for comparison. In these cases, if frequency values of the frequency spectrum is sufficiently different, a leak alarm may be raised.

In the example shown in FIG. 5, and it has been observed that the frequency range between about 350 Hz to about 1,000 Hz may be configured with a relatively lower threshold value 312, while lower frequencies 311 require a comparably higher threshold value. In the preferred embodiment, the frequency range of interest is between zero and 1,200 Hz, and more particularly between about 350 Hz and about 1,000 Hz. It has also been observed that one suitable predetermined threshold value 312 for determining a leakage condition within the frequency range of between about 350 Hz and about 1,000 Hz is about 60.

Turning to the step 230 of computing a sum 502 of measured frequency values 310 of the processed vibration data 217. The highest peaks of the frequency values 310 may be recorded and plotted in the form of a line graph 350 to show the frequency response curve 352 as shown in FIG. 6, for example. It has been determined that computing a total sum 502 of the measured frequency values 310 (in other words, calculating an area under the frequency response curve 352) provides a useful metric in the later steps of determining leakage conditions and locations. The total sum 502 may be calculated for frequency values 310 across the entire frequency range, or for a limited predetermined range of interest as discussed above, and this may be performed using summation or integral numeral calculation techniques. In the preferred embodiment, the summation and/or integral calculations to compute the total sum 502 is performed by the remote server 211 using processed vibration data 217. While in other embodiments, the total sum 502 may be suitably computed by the processor 124 of the water meter 120 or by the sensor 100. In one configuration, one total sum 502 value is computed per set of vibration data 217, which corresponds to all readings processes per scheduled data recording by the sensor 100, and the total sum 502 value can be associated with the corresponding water meter 120 and/or sensor 100.

In step 235, further processing of the raw or measured data 214, 217 occurs to detect and remove, from the data, influences from false-positive conditions arising from external effects such as rainfall noise, traffic noise and water flow noise. In the preferred embodiment, the processing is conducted by the remote server 211 processor.

Noise created by rain drops during a rainfall event may elevate the measured acoustic and vibration data 214, 217 and lead to a false-positive leakage condition if the elevated readings are not accounted for in predetermined threshold comparison values for leakage and location detection. The present invention advantageously detects false-positive leakage conditions attributed to rainfall events in the area of the pipeline network by using only data analysis. In the preferred embodiment, the processor of the remote server 211 determines whether there has been a period of rainfall around the time of data measurement by (1) comparing the measured frequency values and/or the sum values of sensors across a plurality of sensors in the area of the pipeline network against a baseline threshold value and outputting a difference value for each sensor, (2) comparing said difference value for each sensor over consecutive days, and (3) weather forecast data of the area at the time the output data 214, 217 was measured. A rainfall event would be deemed likely if a significant number of sensors 100 and/or water meters 120 in an area of the pipeline network outputted elevated measurement readings 214, 217 above baseline levels, and if these elevated readings are not repeated/consistent over consecutive days—suggesting that the elevated reading levels are temporary and weather dependent. The remote server 211 may also use weather forecast data of the area at the time the output data was measured to corroborate with any changes in elevated reading levels across a large network of sensors 100 and/or water meters 120. If a rainfall event is determined to have occurred around the time of data measurement, then the processor of the remote server 211 adjusts the predetermined threshold values accordingly when comparing measured frequency values and/or sum values of any output data collected during the period of rainfall.

Water usage, for example by a domestic household, during the time of measurement readings may also introduce noise and elevate measured data levels 214, 217. In one embodiment, false-positive conditions attributed to the effect of flowing water as a result of water usage during measurement readings can be detected by the remote server 211 obtaining water usage readings from the associate water meter 120 during the step of recording the acoustic or vibration measurement output data from said sensors to determine water usage. In the event that the water meter 120 indicates water usage, then the remote server 211 discards any acoustic or vibration measurement output data collected from said sensor during a period of water usage to mitigate any influence of water flow as a result of water usage.

Different locations in which sensors 100 and/or water meters 120 are situated may have varying levels of background noise. Areas with naturally-occurring elevated background noise may result in measured output data 214, 217 having a correspondingly elevated output levels, which could trigger false-positive conditions. In one embodiment, each sensor 100 and/or water meter 120 is measured during non-leakage conditions during the same measurement recording time periods (for example, midnight to 2 AM) to establish a baseline frequency response level for non-leakage conditions in the area proximal to the respective sensor 100 and/or water meter 120. A calibrated predetermined threshold value is then determined for each of the sensor(s) 100 and/or water meter 120. The invention then mitigates the effect of background noise by using the calibrated threshold values for each respective sensor 100 and/or water meter 120 when processing and comparing the measured frequency values 214, 217 and sum values 502.

In step 240, the frequency values 310 of the vibration data 217 are compared against corresponding predetermined threshold values 312 for a given frequency bin to determine a leakage condition, as described above. The total sum 502 value of the vibration data 217 for a given water meter 120 and/or sensor 100 can be compared against a predetermined sum threshold value 313 or one or more total sum 502 value(s) of another water meter 120 and/or sensor 100. These comparisons can be performed in conjunction with additional property data of the water meters 120 and/or sensors 100 and pipeline networks, such as meter location and their relative distances, pipeline material, fluid flow pressure, fluid flow type and soil conditions in the relevant area, to determine a location of the leakage. In one embodiment, a suitable predetermined sum threshold value ranges from about 250 to about 300, which indicates proximity to a source of leakage when exceeded by the total sum 502 value.

Figures 7A, 7B, 8:
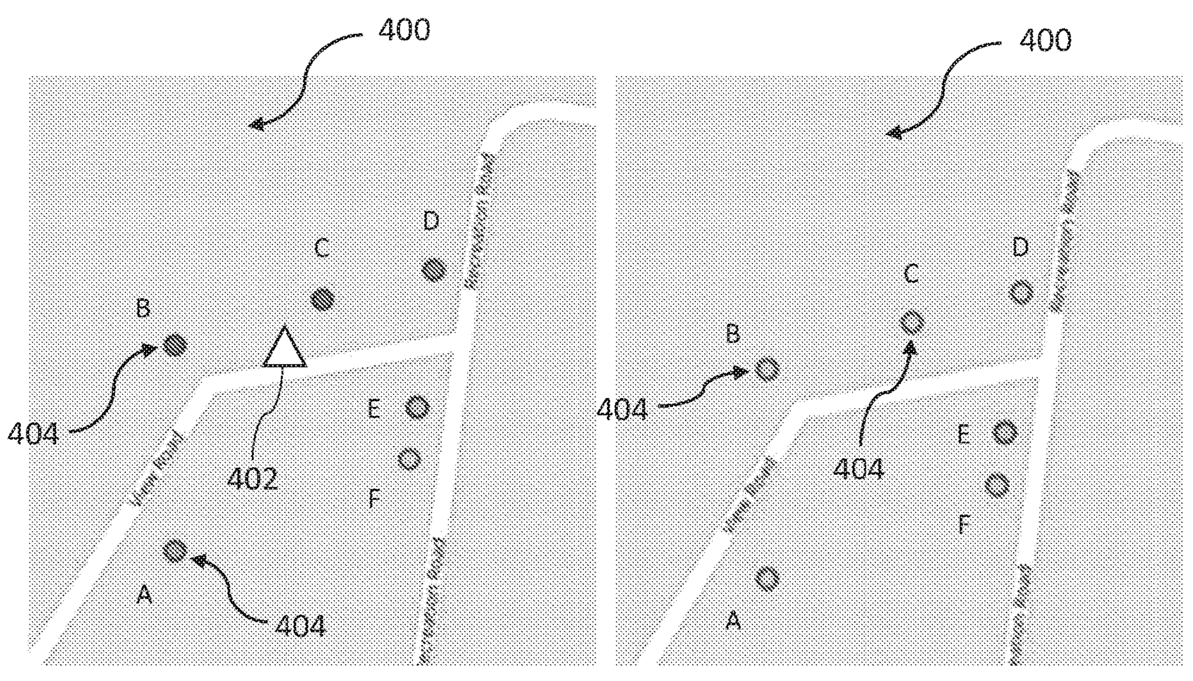
FIG. 7A is a schematic map of an area of the pipeline network with each coloured node corresponding to a water meter/sensor, and the location of the source of leakage.
FIG. 7B is a schematic map of the area of FIG. 7A showing the coloured nodes after the source of leakage had been identified and repaired.
FIG. 8 is a table comparing frequency sum values across the sensors in the pipeline network.

Method step 250 for identifying sensors closest to a source of leakage and the geolocation of a source of leakage will be described with reference to two field trials, the data for which are provided in FIGS. 7 to 11 for illustration. FIGS. 7A and 7B show schematic maps of an area 400 of a pipeline network, in which water meters 120, containing sensors 100, are illustrated by nodes 404, each node denoted by one of letters A to F. FIG. 8 shows a table 500 comparing total sum 502 values of the frequency values 310 of each node 404 in column 504 over a period of time (in this case, for scheduled readings taken over six days), and a field 506 resolving the average total sum 502 value across relevant days. In the preferred embodiment, a heat map can be generated showing the relative magnitudes of the total sum 502 values for each node 404 in the pipeline network of an area 400. In the example shown in FIGS. 7A and 7B, the heat map uses a spectrum of colours between red and green, with the colour red representing closer proximity to a leakage, and the colour green representing farther proximity to a leakage.

In the example as shown in FIG. 8, it can be seen that the first four days of data recordings (dates 1 to 4) produced large total sum 502 values for a select number of nodes 404. For comparison, the last two days of data recordings (dates 5 and 6) produced relatively lower total sum 502 values across all nodes 404, after the corresponding leakage was identified and repaired. Heat maps of the area 400 can be produced to show, per FIGS. 7A and 7B, that nodes 404 A, B, C and D produced elevated levels of total sum 502 values. It has been determined, that the location of the source of leakage lies closer to the node(s) with the highest total sum 502 values. In one embodiment, the method, system or remote server 211 could identify the water meter 120 and/or sensor 100 that is closest to the source of leakage by evaluating the node 404 with the highest total sum 502 value and tracking the water meter 120 and/or sensor 100 that correspond to said node 404. In a further embodiment, the relative geographical locations of each node 404 and the pipeline distances between the nodes (and by extension, the water meters 120 and/or sensors 100) is used in conjunction with the total sums 502 values to triangulate a likely location of the leakage. In a further embodiment, the configuration of pipelines between the nodes or identified sensors are also used to triangulate the likely location of the leakage. Pipeline configurations relate to shapes and configurations of the pipelines and how the pipelines are connected, which influence the acoustic/vibration characteristics of water/fluids flowing through the pipelines. As seen in FIG. 7A, the actual leakage location 402 is located closest to node 404 C, which had the highest pre-repair total sums 502 value, and the actual leakage location 402 can be determined by triangulating the geolocation of the pipelines running between the nodes 404 and the relative strengths of the corresponding total sum 502 values of each node 404. FIG. 7B shows a heat map of the nodes 404 after the leakage repair.

Figure 9:
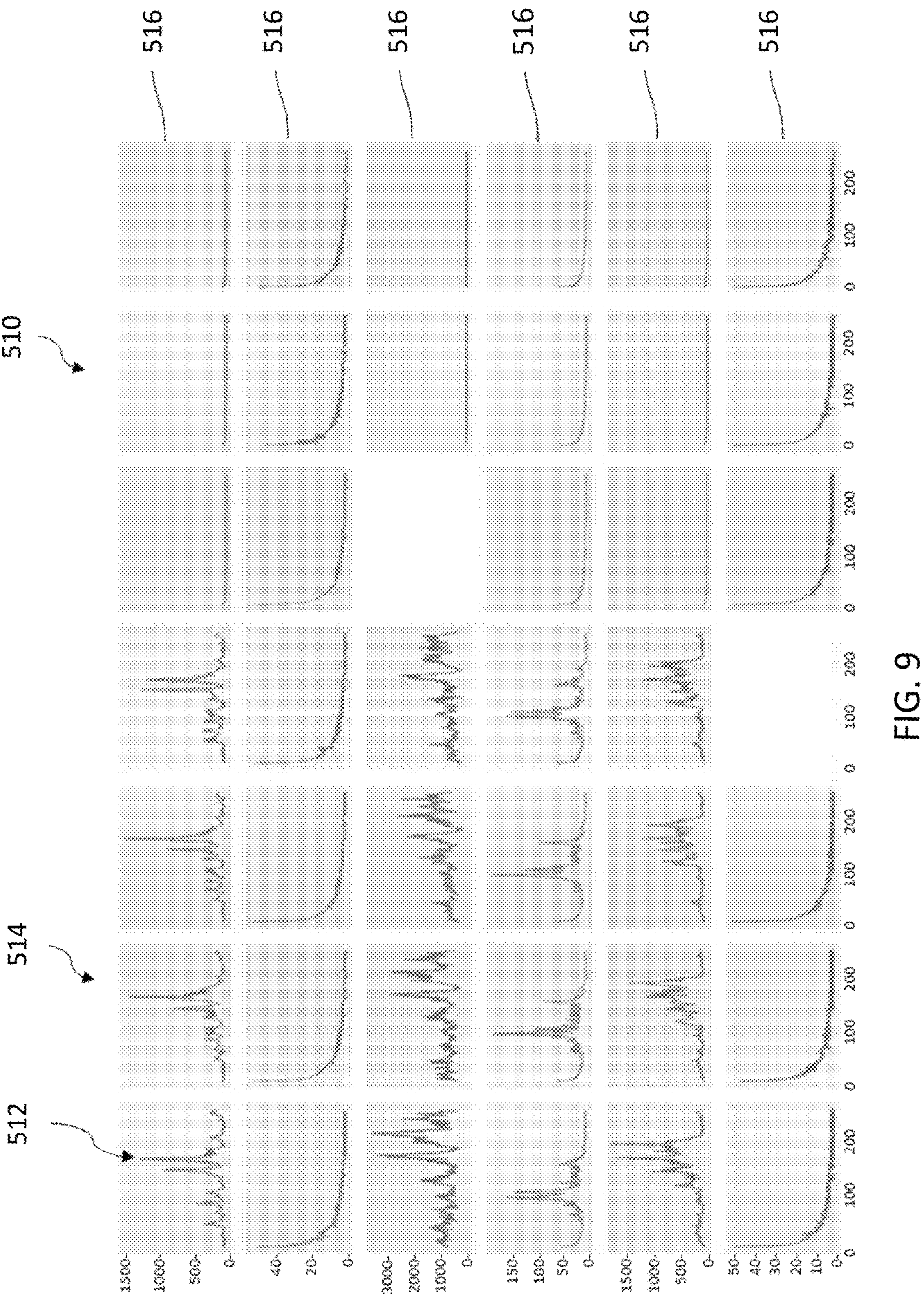
FIG. 9 is an array of frequency plots for each sensor node of FIGS. 7A/B over a period of discrete days.
Figure 11:
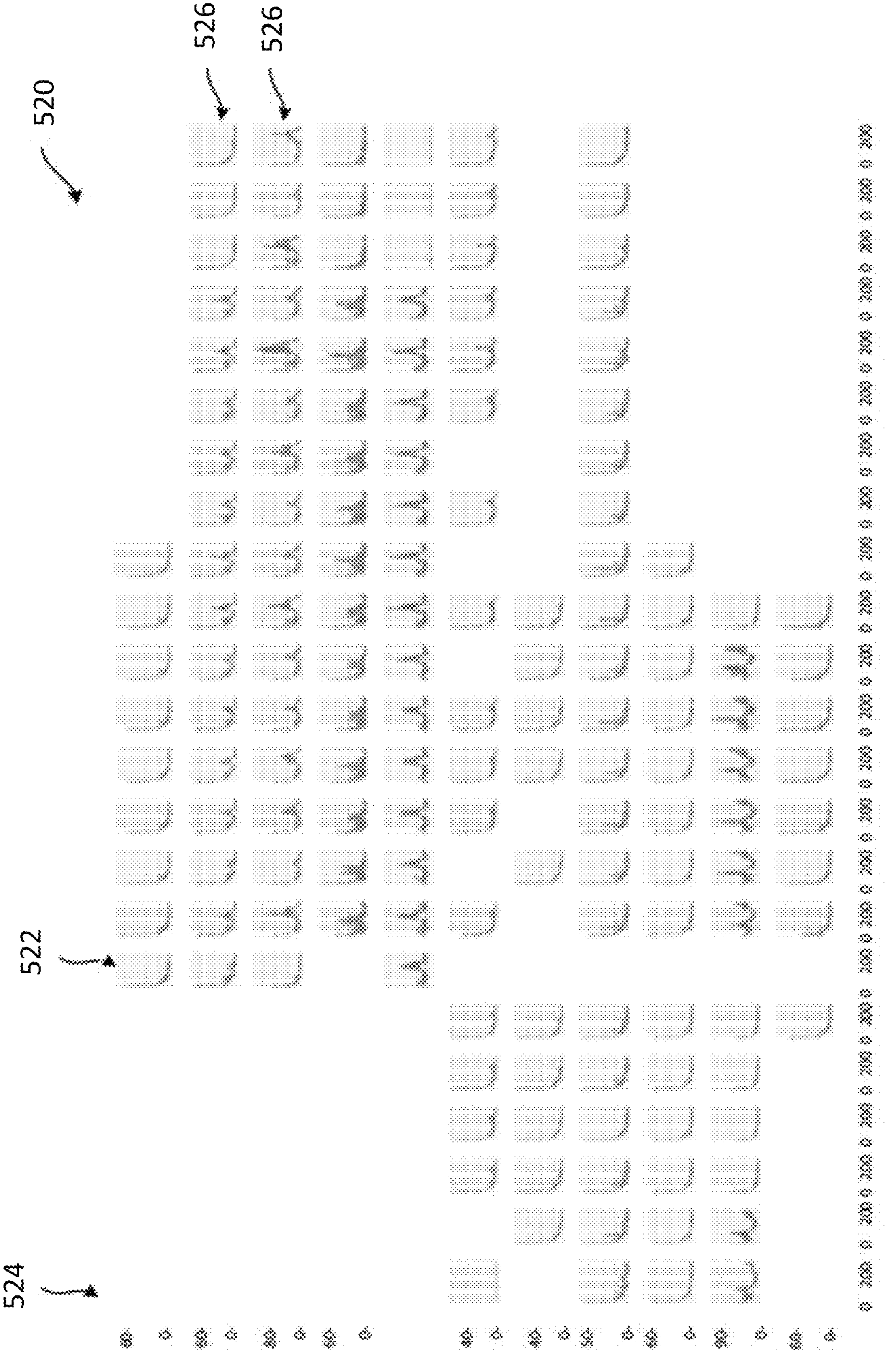
FIG. 11 is an array of frequency plots for each sensor node of FIGS. 10A/B/C over a period of discrete days.

FIG. 9 shows a leakage identification array 510 which follows a method of plotting frequency responses 512 of the processed vibration data 217 of each node 516 across time 514 (discrete days, in this example). In one embodiment, the system or remote server 211 computes the identification array 510 to determine nodes 516 which show statistically significant readings for the presence of a leakage condition, and then further process the total sum 502 values to determine the node 516 which is closest to the location of the source of leakage (the node 516 with the highest total sum 502 value). The total sum 502 values are then used in conjunction with geolocation and relative distance data of the nodes 516 to determine an estimated location 402 of the source of the leakage in the pipeline network.

A further example is shown with respect to FIGS. 10A/B/C and 11. FIGS. 10A, 10B and show a street map, underground pipeline map and a heat map of an area 410 of a pipeline network, in which water meters 120, containing sensors 100, are illustrated by nodes 414. Underground pipelines and their relative locations and placements are shown by lines 416 in FIG. 10B.

Steps described above is similarly followed in this example to produce a leakage identification array 520, which plots frequency responses 522 of the processed vibration data 217 of each node 526 across time 524 (discrete days, in this example). In this example, the system or remote server 211 computes the identification array 520 to determine nodes which show significant readings for the presence of a leakage condition, and then further process the total sum 502 values to determine the node which is closest to the location of the source of leakage (the node with the highest total sum 502 value). The estimated location 412 of the source of the leakage in the pipeline network in the area 410 is identified based on the total sum 502 values and the lengths of the pipeline network connecting the nodes.

In one configuration, triangulation of the leakage location may be performed by identifying spatial locations which simultaneously accord with the distance estimates of the nodes and determining that the identified spatial location is also one in which there is a pipe or conduit of the pipe network.

The acoustic and/or vibration characteristics measured by the sensor 100 may vary depending on a number of factors and these factors may also influence the relative size of the total sum 502 values. A non-limiting list of factors include: size of fluid leakage in the pipeline network, size of the pipeline, type of pipeline (such as junctions, straights and bends), material used for any particular pipelines in the network, fluid pressure of the corresponding pipeline in the network, the fluid flow type of the corresponding pipeline in the network, surrounding earth composition and the soil condition of the area of the pipeline network. In some configurations, the frequency values 310 and/or total sum 502 values are adjusted to accord to one or more of the above described factors to improve the accuracy of the triangulation estimations of the source location of the leakage. In some embodiments, the adjustments are made by way of a predetermined sensitivity multiplier calibrated to account for the factors.

In other embodiments, the location of the source of leakage relative to the water meter 120 and/or sensor 100 may also be estimated by comparing the shape of the frequency response curve 352 with reference to the frequency range, across the nodes 516. In some examples, it may be determined that the source location of the leakage is further away from the node 516 if peaks of frequency values 310 of said node 516 occur at lower frequencies.

It is to be understood that the method described in respect to the present invention may involve a system comprising a plurality of water meters installed in an area of the pipeline network, a sensor connected to each of the plurality of water meters, each sensor being configured to output data relating to an acoustic or vibration measurement associated with a part of the pipeline network proximate said sensor, wherein the water meter is configured to record the acoustic or vibration measurement output data from said plurality of sensors, transform the output data from a time domain to a frequency domain, and send the output data to a remote server, and wherein the remote server comprises a processor configured to: determine a leakage condition by comparing, within a predetermined frequency range, measured frequency values of the transformed output data in the frequency domain with a predetermined threshold value for a corresponding frequency, compute a sum value of the measured frequency values within a predetermined frequency range of the transformed output data in the frequency domain and associating said sum value with a corresponding sensor of said plurality of sensors, and locate a source of the fluid leakage by identifying one or more sensor(s) of the plurality of sensors in the area of the pipeline network that is closest to the source of the fluid leakage based on comparing said sum values associated with said plurality of sensors in the area of the pipeline network over a period of time.

The method described in respect of the present invention may also be performed by a remote server comprising a processor configured to: receive output data, from a plurality of water meters or sensors in an area of the pipeline network, relating to acoustic or vibration measurements as measured by sensors associated with a part of the pipeline network proximate said sensors, transform any time domain output data to data in a frequency domain, determine a leakage condition by comparing, within a predetermined frequency range, measured frequency values of the transformed output data in the frequency domain with a predetermined threshold value for a corresponding frequency, compute a sum value of the measured frequency values within a predetermined frequency range of the transformed output data in the frequency domain and associating said sum value with a corresponding sensor, and locate a source of the fluid leakage by identifying one or more sensor(s) in the area of the pipeline network that is closest to the source of the fluid leakage based on comparing said sum values associated with said plurality of sensors in the area of the pipeline network over a period of time.

Throughout this specification and the claims which follow, unless the context requires otherwise, the word “comprise”, and variations such as “comprises” and “comprising”, will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

While various embodiments of the present invention have been described above, it should be understood that they have been presented by way of example only, and not by way of limitation. It will be apparent to a person skilled in the relevant art that various changes in form and detail can be made therein without departing from the spirit and scope of the invention. Thus, the present invention should not be limited by any of the above described exemplary embodiments.

The invention claimed is:

1. A method of detecting and locating a fluid leakage in a fluid pipeline network, the method comprising:

providing a plurality of sensors in an area of the pipeline network, each of said sensors being configured to output data relating to an acoustic or vibration measurement associated with a part of the pipeline network proximate said sensor, recording the acoustic or vibration measurement output data from said plurality of sensors, transforming the output data from a time domain to a frequency domain, wherein the transformed output data in the frequency domain is separated into discrete frequency bins each containing a range of frequency values, and a peak magnitude value of each frequency bin is recorded, determining a leakage condition by comparing, within a predetermined frequency range, the peak magnitude values of the transformed output data in the frequency domain with predetermined threshold values for corresponding frequency bins, computing, for each sensor of said plurality of sensors, a sum value of the peak magnitude values within a predetermined frequency range of the transformed output data in the frequency domain, locating a source of the fluid leakage by identifying at least two sensors of said plurality of sensors in the area of the pipeline network that are closest to the source of the fluid leakage, wherein the at least two sensors closest to the source of the fluid leakage are identified based on comparing said sum values of the peak magnitude values of each sensor with other sensors in the plurality of sensors in the area of the pipeline network over a period of time, and estimating a location of the source of the fluid leakage based on (1) a relative geographical pipeline distance between the identified sensors, (2) configuration of pipelines between the identified sensors, and (3) the identified sensors' respective sum values.

2. A method according to claim 1, wherein locating a source of the fluid leakage comprises comparing each of said sum values of said plurality of sensors against a predetermined sum threshold value.

3. A method according to claim 1, wherein each of said sum values of said plurality of sensors is adjusted by:

(i.) a predetermined material sensitivity multiplier calibrated to the material of the corresponding pipeline in the network;

(ii.) a predetermined pressure sensitivity multiplier calibrated to accord with a fluid pressure of the corresponding pipeline in the network (iii.) a predetermined flow sensitivity multiplier calibrated to accord with a fluid flow type of the corresponding pipeline in the network; and (iv.) a predetermined soil condition sensitivity multiplier calibrated to accord to a soil condition of the area of the pipeline network.

4. A method according to claim 3, further comprising the step of determining the magnitude of fluid leakage based on said sum values of said plurality of sensors in the area.

5. A method according to claim 4, wherein the step of determining the magnitude of fluid leakage further comprises adjusting said sum values of said plurality of sensors in the area with any one or more of the sensitivity multipliers.

6. A method according to claim 1, wherein locating a source of the fluid leakage further comprises the steps of determining whether said acoustic or vibration measurement output data was collected during a period of rainfall in the area of the pipeline network and, if so, adjusting a predetermined threshold value when comparing at least one of measured frequency values and sum values of any output data collected during the period of rainfall.

7. A method according to claim 6, wherein determination of the period of rainfall is based on (1) comparing at least one of the measured frequency values and the sum values of said plurality of sensors across a plurality of sensors in the area of the pipeline network against a baseline threshold value and outputting a difference value for each sensor, (2) comparing said difference value for each sensor over consecutive days, and (3) weather forecast data of the area at the time the output data was measured.

8. A method according to claim 1, wherein a Fast Fourier Transform (FFT) process is used to convert the output data from a time domain to a frequency domain.

9. A method according to claim 1, wherein the frequency values of the transformed output data is separated into 256 discrete frequency bins.

10. A method according to claim 1, wherein the predetermined frequency range is between zero and 1,200 Hz.

11. A method according to claim 10, wherein the predetermined frequency range is between 350 Hz and 1,000 Hz.

12. A method according to claim 1, wherein each of said sensors is configured to take acoustic or vibration measurements associated with a part of the pipeline network proximate said sensor at spaced intervals during a predetermined time period.

13. A method according to claim 1, wherein each of said sensors is connected to an associated water meter, which records the acoustic or vibration measurement output data from the connected sensor, transforms the output data from a time domain to a frequency domain, and sends the data to a remote server.

14. A method according to claim 13, wherein locating a source of the fluid leakage further comprises the steps of (1) obtaining water usage readings from the associate water meter during the step of recording the acoustic or vibration measurement output data from said sensors to determine water usage, and (2) discarding any acoustic or vibration measurement output data collected from said sensor during a period of water usage.

15. A system for detecting and locating a fluid leakage in a fluid pipeline network, the system comprising:

a plurality of water meters installed in an area of the pipeline network, a sensor connected to each of the plurality of water meters, each sensor being configured to output data relating to an acoustic or vibration measurement associated with a part of the pipeline network proximate said sensor, wherein at least one of the water meter and the sensor is configured to record the acoustic or vibration measurement output data, transform the output data from a time domain to a frequency domain, and send the output data to a remote server, wherein the transformed output data in the frequency domain is separated into discrete frequency bins each containing a range of frequency values, and a peak magnitude value of each frequency bin is recorded, and wherein the remote server comprises a processor configured to:

determine a leakage condition by comparing, within a predetermined frequency range, the peak magnitude values of the transformed output data in the frequency domain with predetermined threshold values for corresponding frequency bins, compute, for each sensor of the plurality of sensors, a sum value of the peak magnitude values within a predetermined frequency range of the transformed output data in the frequency domain and associating said sum value of the peak magnitude values with a corresponding sensor of said plurality of sensors, locate a source of the fluid leakage by identifying at least two sensors of the plurality of sensors in the area of the pipeline network that-is are closest to the source of the fluid leakage, wherein the at least two sensors closest to the source of the fluid leakage are identified based on comparing said sum values of the peak magnitude values across the plurality of sensors in the area of the pipeline network over a period of time, and estimate a location of the source of the fluid leakage based on (1) a relative geographical pipeline distance between the identified sensors, (2) configuration of pipelines between the identified sensors, and (3) the identified sensors' respective sum values.

16. A remote server when used for detecting and locating a fluid leakage in a fluid pipeline network, the server comprising a processor configured to:

receive output data, from at least one of a plurality of water meters and sensors in an area of the pipeline network, relating to acoustic or vibration measurements as measured by sensors associated with a part of the pipeline network proximate said sensors, transform any time domain output data to data in a frequency domain, wherein the transformed output data in the frequency domain is separated into discrete frequency bins each containing a range of frequency values, and a peak magnitude value each frequency bin is recorded, determine a leakage condition by comparing, within a predetermined frequency range, the peak magnitude values of the transformed output data in the frequency domain with a predetermined threshold value for a corresponding frequency bins, compute, for each sensor of the plurality of sensors, a sum value of the peak magnitude values within a predetermined frequency range of the transformed output data in the frequency domain and associating said sum value of the peak magnitude values with a corresponding sensor, locate a source of the fluid leakage by identifying at least two sensors in the area of the pipeline network that is are closest to the source of the fluid leakage, wherein the at least two sensors closest to the source of the fluid leakage are identified based on comparing said sum values of the peak magnitude values across the plurality of sensors in the area of the pipeline network over a period of time, and estimate a location of the source of the fluid leakage based on (1) a relative geographical pipeline distance between the identified sensors, (2) configuration of pipelines between the identified sensors, and (3) the identified sensors' respective sum values.

* * * * *